(12) United States Patent
Allie et al.

(10) Patent No.: US 11,811,639 B2
(45) Date of Patent: *Nov. 7, 2023

(54) CLOUD AGNOSTIC SERVICE DISCOVERY

(71) Applicant: Snowflake Inc., Bozeman, MT (US)

(72) Inventors: Jonathan C. Allie, Newton, NC (US); Seth Hettich, Los Altos, CA (US); Aaron S. Joyner, Granite Falls, NC (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,218

(22) Filed: Dec. 2, 2022

(65) Prior Publication Data
US 2023/0300055 A1 Sep. 21, 2023

Related U.S. Application Data

(63) Continuation of application No. 17/698,891, filed on Mar. 18, 2022, now Pat. No. 11,528,212.

(51) Int. Cl.
| | |
|---|---|
| *H04L 43/50* | (2022.01) |
| *H04L 67/02* | (2022.01) |
| *H04L 67/133* | (2022.01) |
| *H04L 43/0817* | (2022.01) |
| *H04L 61/4541* | (2022.01) |
| *H04L 61/4511* | (2022.01) |
| *H04L 67/1036* | (2022.01) |
| *H04L 43/0805* | (2022.01) |

(52) U.S. Cl.
CPC .......... *H04L 43/50* (2013.01); *H04L 43/0805* (2013.01); *H04L 43/0817* (2013.01); *H04L 61/4511* (2022.05); *H04L 61/4541* (2022.05); *H04L 67/02* (2013.01); *H04L 67/1036* (2013.01); *H04L 67/133* (2022.05)

(58) Field of Classification Search
None
See application file for complete search history.

(56) References Cited

U.S. PATENT DOCUMENTS

| | | | | |
|---|---|---|---|---|
| 6,167,446 | A * | 12/2000 | Lister | H04L 67/1001 709/224 |
| 6,202,089 | B1 * | 3/2001 | Juster | H04L 67/01 719/330 |
| 6,286,047 | B1 * | 9/2001 | Ramanathan | H04L 67/51 370/254 |
| 7,653,747 | B2 * | 1/2010 | Lucco | H04L 45/02 709/245 |
| 7,840,671 | B2 * | 11/2010 | Fischer | H04L 61/45 709/227 |
| 10,033,691 | B1 * | 7/2018 | Mizik | H04L 67/10 |

(Continued)

*Primary Examiner* — Lashonda Jacobs-Burton
(74) *Attorney, Agent, or Firm* — Womble Bond Dickinson (US) LLP

(57) ABSTRACT

A system may include a processing device and a memory storing instructions that, when executed by the processing device, causes the processing device to discover one or more endpoints of a service in view of a name that is unique to the service. In response to receiving a request to resolve the name from a client, the processing device may obtain the one or more endpoints of that service in view of the name. The processing device may filter the one or more endpoints, in view of the name and return the one or more endpoints which are filtered, to the client.

20 Claims, 6 Drawing Sheets

(56) References Cited

U.S. PATENT DOCUMENTS

| | | | |
|---|---|---|---|
| 10,078,682 B2* | 9/2018 | Tan | G06F 16/2228 |
| 10,243,919 B1* | 3/2019 | Suresh | H04L 67/1001 |
| 10,340,444 B2* | 7/2019 | Makimura | H10N 52/80 |
| 10,554,616 B1* | 2/2020 | Teodosiu | H04L 63/168 |
| 10,735,370 B1* | 8/2020 | Kandlur | G06F 9/542 |
| 10,839,073 B2* | 11/2020 | Chen | G06F 21/554 |
| 10,855,596 B2* | 12/2020 | Thiagarajan | H04L 43/0876 |
| 10,862,852 B1* | 12/2020 | Thunga | H04L 67/565 |
| 11,050,792 B2* | 6/2021 | Venkatasubramanian | H04L 61/4511 |
| 11,290,418 B2* | 3/2022 | Vasquez | H04L 61/5007 |
| 2007/0223446 A1* | 9/2007 | McMenamy | H04L 65/1101 370/351 |
| 2008/0059656 A1* | 3/2008 | Saliba | H04L 67/1095 709/248 |
| 2010/0094925 A1* | 4/2010 | St Jacques, Jr. | H04N 7/173 709/202 |
| 2013/0179548 A1* | 7/2013 | Singh | G06F 8/61 709/220 |
| 2018/0144031 A1* | 5/2018 | Lavelle | G06F 16/2455 |
| 2019/0095478 A1* | 3/2019 | Tankersley | G06F 11/3476 |
| 2020/0403911 A1* | 12/2020 | Singhal | H04L 45/34 |
| 2022/0200957 A1* | 6/2022 | Prabagaran | H04L 61/5069 |

\* cited by examiner

CLOUD AGNOSTIC SERVICE DISCOVERY

CROSS-REFERENCE TO RELATED APPLICATIONS

This application claims the benefit of U.S. patent application Ser. No. 17/698,891 filed Mar. 18, 2022, which is incorporated by reference herein in its entirety.

TECHNICAL FIELD

The present disclosure relates to service discovery and more particularly relates to cloud agnostic service discovery.

BACKGROUND

A server provides a functionality which is available to clients. A server host may host one or more services which may be accessed by clients that wish to use the functionality provided by the server. Commonly used services include email, a file server, a web server. Services may also be more specific in nature, such as providing business logic tailored to a particular application. In some cases, services may seek out other services for inter-service communication (e.g., in a microservices environment).

BRIEF DESCRIPTION OF THE SEVERAL VIEWS OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
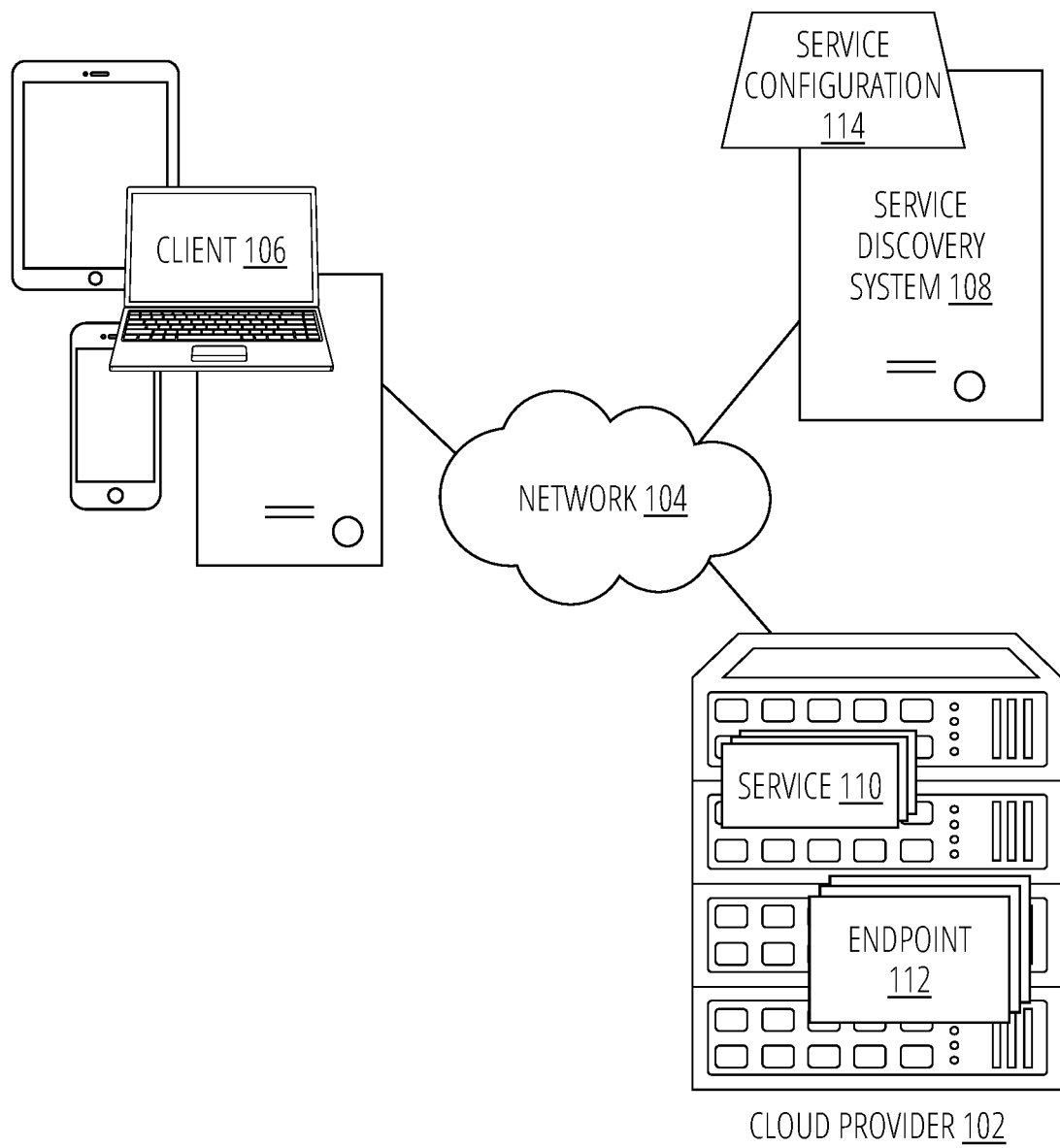
FIG. 1 shows an example computing environment that includes a service discovery system, according to some embodiments.

A client may seek to connect to a service over a network. The client may be another service, a virtual machine, an application, a component of an application, a device, or other type of client. Service discovery is a process for clients (e.g., applications and services) to locate each other on a network.

Under conventional systems, a central server or servers may maintain a global view of addresses. A client may connect to the central server to update or retrieve the address to a service. In some systems, service discovery may be achieved through a variety of means such as having hard-coded internet protocol (IP) addresses of individual machines or of load balancers, through queries to cloud-vendor application programming interfaces (APIs), or through a domain name system (DNS) lookup. Each of these solutions, however, have various shortcomings that confine the solution to a narrow domain or limits the manner or environment in which services may be deployed and built.

For example, a domain name system (DNS) can deliver a limited subset of information such as through A records or CNAME records). An A record indicates just an IP address of an endpoint. A CNAME refers to an alias of a domain. A DNS-based approach to service discovery does not utilize information about the client making the request. As such, service discovery is not tailored to a particular client, nor is it tailored for the services that are being discovered.

A service discovery system based on hard-coded IP address has similar limitations, with the additional burden of maintaining the hard-coded IP addresses within each client. Such an approach lacks flexibility and places the burden on the client.

Similarly, a cloud load-balancer approach to service discovery also has drawbacks. Cloud load-balancers incur additional costs of each load-balancer. Cloud load-balancers have limited flexibility in their health checking methods and they are necessarily in the data path on the network, which may be undesirable. Load-balancers typically do not support client-side load-balancing decisions.

Similarly, querying cloud vendor APIs for tags or other metadata puts a burden on the client to know a specific tagging scheme that corresponds to the data that the client wishes to find. Even with knowledge of the specific tagging scheme, cloud vender APIs may not return all the information that is required for the client to make a connection with the desired service. Such an approach may require each client to have the libraries and credentials in order to make metadata-based queries. Further, under such an approach, each client will separately query cloud APIs for each discovery request, which is inefficient.

Further, the conventional service discovery approaches may not provide a centralized platform that is agnostic to cloud providers and performs health checking of endpoints related to a given service using a common infrastructure.

The systems and methods described herein address some of the shortcomings described above. Such a system may incorporate service discovery concepts not utilized in conventional systems. Service names are, at root, a shorthand "reference" to a set of hosts, tasks, or endpoints that share a set of common attributes such as, for example, "the nginx frontend servers", "the FDB leader", etc. The useful set of attributes for a service also extends to concepts such as "health" of an endpoint. For example, a service name that resolves to "the currently healthy hosts" is more useful to potential clients than the raw addressing information for all hosts for the service name. Service owners are often the best authority on their services, including how a service should be discovered, and what it means for a given service to be healthy. Further, a service discovery system should be able to discover information for a given service without requiring the service that is being discovered to actively participate in the discovery. Service discovery should be performed in a flexible manner that accommodates a wide range of third parties (e.g., cloud providers) or legacy systems. Finally, the presentation of naming data should be uniform, and rich enough to enable extensibility.

Aspects of the present disclosure combine name resolution, service discovery, and health checking, which may be tailored to a given client or to a given service that is to be resolved. A service discovery system may use a service name which is unique to a given service, to look up how the service is to be discovered. The service discovery system can discover all the endpoints associated with the given service, based on those instructions. The instructions may be configurable and tailored to each service. Such an approach allows the service discovery system to perform discovery for different services over a range of cloud provider platforms in an extensible manner.

A service discovery system may receive a request from a client that includes the unique service name that the client wishes to connect with. The service discovery system may pull the endpoint or endpoints associated with that service, and then use the service name to determine how to filter the results, transform the results, or both. The filtered version of the endpoint or endpoints may be returned to the client.

Further, the service discovery system may check the health of endpoints that are associated with each of the unique service names. The manner in which the health of endpoints is checked may vary from one service to another. The service discovery system may use the unique service name to look up how each of the endpoints is to be health checked for a given service. The service discovery system may annotate the health of each of the endpoints associated with each of the services. Service discovery and health checking may be performed on their own independent schedules in an asynchronous manner. They may be performed periodically to update endpoint information for each of the services.

FIG. 1 shows an example computing environment that includes a service discovery system, according to some embodiments. One or more cloud providers 102 may each host one or more services 110. A cloud provider 102 may be understood as a collection of compute services and resources that are connected to network 104. Network 104 may include interconnected computing devices that can exchange data and share resources with each other. The networked devices may use one or more communications protocols to communicate with each other physical or wireless technologies.

Each of cloud provider 102 may include hardware and software that serve as a platform to provide applications, storage services, hosting, and other functionality. Users may build and deploy one or more services to be hosted by a cloud provider. The cloud provider may include various services and API that allows users to manage and access their services. A cloud provider may include endpoints 112, which may represent hardware compute devices, software components, or both, that are provided by cloud providers 102 to host service 110. Each of the one or more services 110 may be accessible through one or more of endpoints 112. Each service endpoint 112 may be referenced as an address (e.g., an IP address, or an IP address and a port number) that a client 106 may use to connect to one of the services 110.

A client 106 may be an application, a virtual machine, a service, or component that is running on a computing device that is also connected to network 104. Although shown as separate, the client 106 may be hosted by one or more of the cloud providers 102. In some aspects, the client 106 may be one of the services 110.

In some examples, services 110 may include microservices that work together to form a microservices application. For example, a microservice application may include a plurality of services that communicate with each other to provide related functionality to users. A first service may wish to connect to a second service to obtain information needed by the first service to perform business logic. As such, the first service may wish to obtain one or more endpoints that are associated with the second service, for the first service to use to connect to the second service.

Service discovery system 108 may help a client 106 connect to a respective service 110. Service discovery system 108 may have a monolithic architecture, or a distributed architecture. For example, service discovery system 108 may include one or more services that run on one or more computing devices that are connected to network 104. Although shown as separate, service discovery system 108 may also be hosted on one or more cloud providers 102.

The service discovery system 108 may discover one or more endpoints of a service (such as any of the one or more services 110) in view of a name that is unique to the service. For example, service discovery system 108 may have access to each of the service names of services 110 which may be defined in a service configuration 114. The service discovery system 108 may use the service name of a given service to lookup instructions (e.g., in service configuration 114) for discovering the endpoints of that named service. These instructions may be specific to that service. Instructions may vary from service to service, for example, based on which of the one or more cloud providers 102 a service is deployed to, or other nuances of the service. The service discovery system 108 may gather and store the endpoints 112 for each one of the services that it is configured to discover. Endpoints 112 includes information such as an IP address or IP address and port number, that a client may use to connect to a given service.

In response to receiving a request to resolve the name from a client 106, the service discovery system 108 may obtain the one or more endpoints 112 of the service, in view of the name. For example, client 106 may send a request to resolve a name such as '/zns/prod1/fdb/serviceC'. The service discovery system 108 may obtain, from its store of endpoints, all the endpoints that are discovered for '/zns/prod1/fdb/serviceC'. Each of these endpoints may include at least an IP address and a port number that may be used by the client 106 to connect to the service that is identified uniquely by '/zns/prod1/fdb/serviceC'.

The service discovery system 108 may filter and/or transform the one or more endpoint 112 of that service, in view of the name. For example, the service discovery system 108 may refer to service configuration 114 to obtain instructions that detail how to filter the one or more endpoints for '/zns/prod1/fdb/serviceC'. The service discovery system 108 may apply these instructions to the one or more endpoints for '/zns/prod1/fdb/serviceC'. The filtering may or may not remove some of the endpoints for that service to be presented to the client. Other modifications may be made to the endpoints prior to presentation to the client, as discussed in other sections. The service discovery system 108 may return the resulting one or more endpoints which are filtered, to the client 106.

In some examples, service discovery system 108 may perform health checking of each of the services 110 in view of the name of the one or more endpoints 112. For example, service discovery system 108 may refer to the service configuration 114 to obtain health check instructions. The health check instructions may describe how to perform a health check for each of the one or more endpoints that are associated with the name '/zns/prod1/fdb/serviceC'. The service discovery system may perform health checking for every other service that service discovery system 108 is configured to manage. The health check instructions may be unique or specific to each service. Service discovery system 108 may persist the health check results for each endpoint so that, when the endpoints for a given service are returned to a client 106, the service discovery system may make presentation decisions based on the health status for that endpoint. For example, the service discovery system may or may not prune information for endpoints that are indicated as 'unhealthy'. The presentation of the endpoint information to a client may also be performed in view of the service name, as described in other sections.

The service discovery system 108 may expose service configuration 114 to service owners. A service owner may configure the service discovery system 108 to tailor discovery, name resolution filtering, and health checking, on a per-service basis. In such a manner, service discovery system 108 may provide a standard interface for service discovery, that is cloud agnostic from the perspective of the client. Service discovery system 108 supports a self-service configuration model that allows service owners to control the discovery, health monitoring, and presentation of their services. The service discovery system 108 may adapt a variety of different models of endpoint discovery and presentation, and is extensible (e.g., through inputs to the service configuration 114). A service owner may configure the service discovery system to discover endpoints for a given service without code changes to the service discovery system. Performance and reliability is improved, promoting use of such a system in critical production paths. The service discovery system can scale up and down gracefully, be built on well-understood technologies, and be deployed to a variety of cloud providers.

Figure 2:
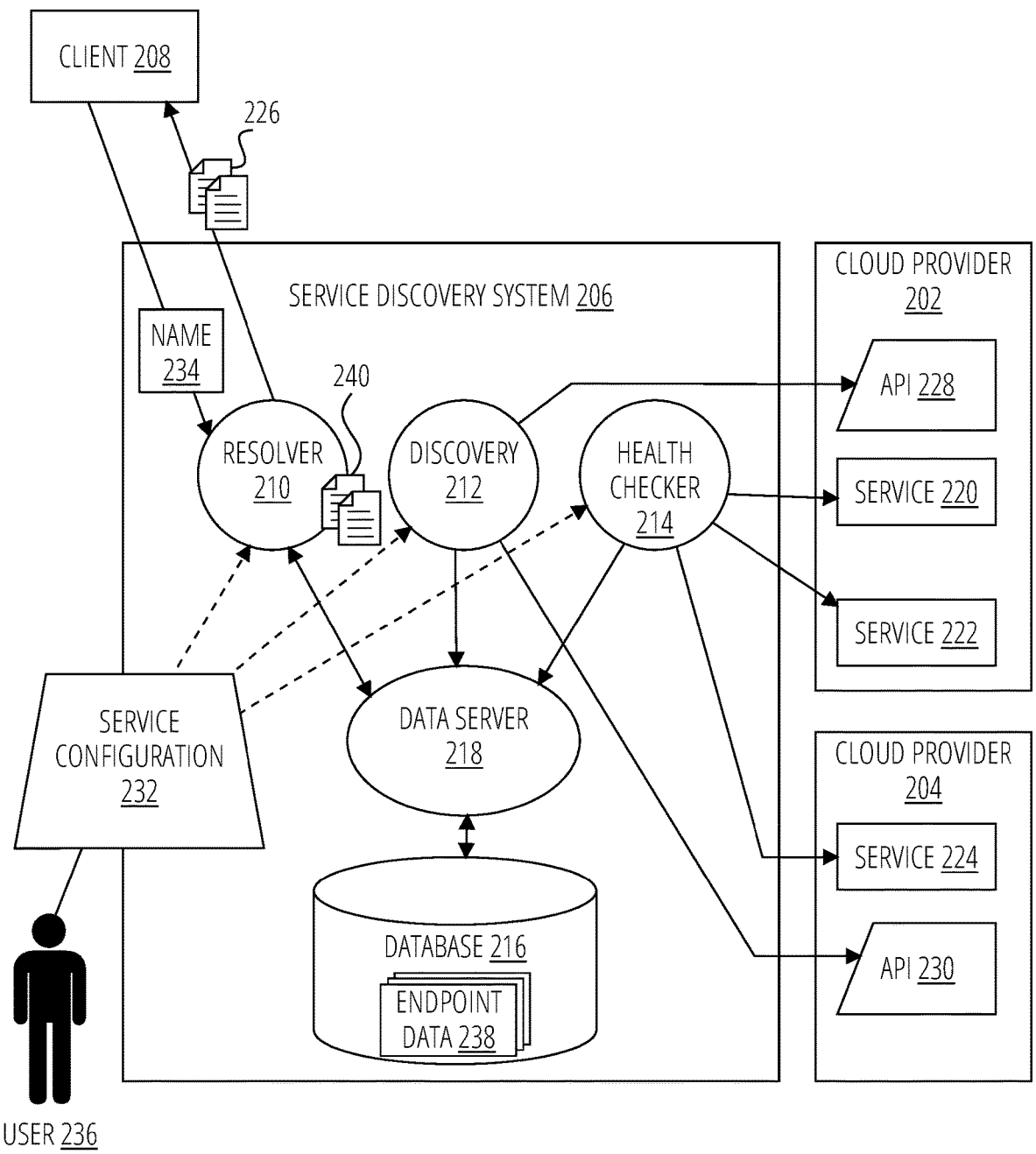
FIG. 2 shows an example of a service discovery system, according to some embodiments.

FIG. 2 shows an example of a service discovery system 206, according to some embodiments. A client may wish to connect with a given service, such as service 220, 222, or 224. A client 208 may send a request to service discovery system 206 to resolve a name 234, which may also be understood as a service name or a zname. The name 234 presented by the client is unique to a given service that the client wishes to connect with.

The name 234 may be treated as a logical name that encapsulates a set of criteria used for managing a set of endpoints of that service. The service discovery system 206 may manage a set of endpoints based on the name 234, which is used by the service discovery system, as well as service owners, to group the endpoints by service. The service discovery system performs endpoint management with three distinct concerns—discovery, health checking, and resolution.

Generally, discovery is performed by discovery engine 212. The job of the discovery engine is to obtain endpoint information for each of the services that the service discovery system is configured to manage. Name resolution is performed by the resolver 210. The resolver 210 handles requests from clients to resolve a service based on name 234, pulls the discovered endpoints that are associated with that name 234, and then returns them back to the client. The resolver may filter or otherwise modify the endpoint information based on criteria that may be specific to that service. Health checking is performed by health checker 214. The health checker 214 performs various actions to determine the health of a given endpoint, and then stores the results with the discovery information of that endpoint, so that it may be used at a later time when resolving a name for a client. These components are described in further detail below.

Discovery engine 212 may obtain instructions from a service configuration 232 that define how discovery is to be performed for each of the service names. Service configuration 232 may also define all of the services (e.g., by service name) that the service discovery system 206 is to manage endpoints for. Discovery engine 212 may perform discovery for each service named in the service configuration 232 and store the discovery information in database 216. Service configuration 232 may be a file, a database, an application, or a combination thereof. It may be singular or distributed. Further, it may be integral to the service discovery system 206 or reside on a separate host. In some aspects, it may reside in a repository for software project management.

Service configuration 232 defines the mechanisms for discovering endpoints that are associated with a given service. Endpoint discovery can take various forms such as, for example, static enumeration of IP addresses, periodic resolution of DNS, querying tag values in a cloud provider, via manual 'registration' via remote control protocol (RPC) or other discovery mechanisms. User 236, which may be a service owner, may define the mechanisms for each service name in the service configuration 232. Discovery engine 212 may perform discovery for each of the services named in the service configuration based on a discovery schedule, for example, every 'x' hours, every Monday, or so on.

For example, discovery engine 212 may refer to service configuration 232 to determine how to perform discovery for '/zns/prod1/fdb/serviceC'. Service configuration 232 may specify that, for '/zns/prod1/fdb/serviceC', three static IP addresses are to serve as endpoints for the service. The static IP addresses may be named in the service configuration 232 as: "name: serverX, ip_address: 127.0.0.1, port: 6661; name: serverY, ip_address: 127.0.0.1, port: 6662; and name: serverZ, ip_address: 127.0.0.1 port: 6663". In such a case, discovery engine 212 may access data server 218 to store the three endpoints (each with a name, IP address, and port number) to the database 216 under that service name '/zns/prod1/fdb/serviceC'.

In some examples, discovery engine 212 may query external data sources such as a cloud provider 202 or cloud provider 204 to obtain endpoint data (e.g., name, IP address, and port number for an endpoint). For example, discovery engine 212 may reference the service configuration 232 using '/zns/prod1/fdb/serviceC' to obtain a tag key, such as 'serviceCkey'. The discovery engine 212 may query a cloud provider 202 or 204 (e.g., through respective APIs 228, 230) with the key to get a corresponding value, such as the endpoint name, ip address, and port for each of the endpoints that are associated with '/zns/prod1/fdb/serviceC'. The discovery engine 212 may store those endpoints in database 216 under that service name '/zns/prod1/fdb/serviceC'. It should be understood that, in some cases, where the endpoint is a host, there may be no port number. Further, the endpoint name may be blank in some cases. The service configuration 232 may include other discovery instructions for discovery engine 212 to perform, such as indicating an address where the endpoint information is stored or is to be obtained.

In some examples, the service discovery system 206 may include a registration API that allows a user to configure a service so that a user can manually register endpoints of the service through a RPC or gRPC call. The registration API can be a standalone component or integrated within the same service binaries of the discovery engine 212.

In such a manner, discovery engine 212 collects the endpoint data 238 for each of the services the service discovery systems 206 is to manage using the actions described in service configuration 232, and updating the endpoint data 238 by communicating with data server 218.

Resolver 210 may interface with a client 208 by receiving a request to resolve a name 234. For example, resolver 210 may obtain a request from client 208 to resolve '/zns/prod1/fdb/serviceC'. Assuming that this name corresponds to service 222, the resolver 210 will try to find the one or more endpoints that have been discovered for service 222, and return that information (or a subset of that information) to the client 208.

Resolver 210 may communicate with data server 218 (e.g., via a GET ('/zns/prod1/fdb/serviceC') command) to obtain from the endpoint data 238 the relevant endpoints 240 that are associated with service 222. End points 240 may be one endpoint, or numerous endpoints. For example, as discussed above, end points 240 may include a first endpoint that includes "name: serverX, ip_address: 127.0.0.1, port: 6661", a second endpoint that includes "name: serverY, ip_address: 127.0.0.1, port: 6662" and a third endpoint that includes "name: serverZ, ip_address: 127.0.0.1 port: 6663".

Further, resolver 210 may filter the results of endpoints 240, in view of filtering criteria that is specified for '/zns/prod1/fdb/serviceC' in the service configuration 232. Service configuration 232 may include instructions that relate to presentation of the endpoints 240 to a client. Such instructions may include to filter out stale endpoint data, omit unhealthy endpoints, calculate a subset of the endpoints 240 tailored to the client 208, add a port number, or combinations thereof.

Regarding stale endpoint data, each of the endpoints may have a timestamp that state when the endpoint was generated or updated by discovery engine 212. If the timestamp for the second endpoint is older than a threshold amount (e.g., 'x' days), then the resolver 210 may remove that second endpoint from endpoints 240 so that the client is not presented with old endpoint data that may not be reliable.

Additionally, or alternatively, service configuration 232 may specify to drop 'unhealthy' endpoints for '/zns/prod1/fdb/serviceC'. Each of the endpoints 240 may have a health indicator that indicates a state of health of the endpoint (as determined by health checker 214). Resolver 210 may check each of the health indicators of endpoints 240 and drop any endpoints that are unhealthy.

Resolver 210 may present the resulting endpoints 226, which are filtered, to client 208. In such a manner, a user 236 may dictate how endpoints are to be presented to a client which may be tailored to a given service. In some examples, the service configuration 232 may also tailor the filtering criteria in view of the identity of the client 208. For example, service configuration 232 may specify that, for client 106, the resolver 210 is to perform a first set of filtering rules (e.g., give the raw endpoint data without filtering), and for all clients that are not client 106, resolver 210 is to perform a second set of filtering rules (e.g., remove unhealthy endpoints). The resolver 210 may obtain information in the client request that indicates the identity of the client 106 and filter the endpoints 240 accordingly.

In some examples, resolver 210 may include an RPC or gRPC interface for some clients. The interface may include a resolve interface which a client may call upon to resolve a name 234. For example, a client may use the interface to call RESOLVE ('/zns/prod1/fdb/serviceC'). The resolver 210 handles the call by performing the operations described above, and returning the filtered endpoint information 226 to the client. Additionally, or alternatively, the resolver interface may include a watch interface which a client 208 may call to watch a given name 234. In response to receiving a watch call from client, the service discovery system 206 may provide the client with unprompted updates to endpoints of the service associated with the name that the client is watching.

In some embodiments, the resolver 210 may include interfaces that are DNS-based or that use an HTTP interface. Clients that are not aware of service discovery system 206 or the underlying naming convention for name 234 may utilize these more universal interfaces.

Health checker 214 may perform a health check on the one or more components of the service in view of the name of the service. For example, health checker 214 may obtain health check instructions in the service configuration 232 that are specific to a given name, and use those health check instructions to test the health of each of the one or more endpoints that are associated with that service. Health check instructions may include performing a socket check (e.g., a TCP socket check), querying an HTTP endpoint, or other health check operations or combinations thereof.

The health checker 214 may perform health checking for each of the services named in service configuration 232. For a given name, the health checker may query the data server 218 to pull all the discovered endpoints associated with that name. The health checker may then perform the actions on those discovered endpoints. Based on the result of the health check test, the health checker may store the health status of each of the endpoints in endpoint data 238.

In such a manner, when a client 208 requests resolution of a service name 234, the resolver 210 may obtain the corresponding endpoints 240 for that name 234 and filter those results based on health. Even if the resolver 210 does not filter out unhealthy endpoints, the client 208 may be presented with endpoint data 226 that includes a health indicator, in some cases.

The health checker 214 may perform health checking based on a health check schedule. Health checking and discovery may be performed asynchronously, according to separate schedules. The schedules for health checking and discovery may also be configured by a user 236 in service configuration 232. Each of the resolver 210, the discovery engine 212, the data server 218, and the health checker 214 may include one or more services that perform the operations described.

Data server 218 may provide low-level access to raw endpoint data to the components of the service discovery system 206. Data server 218 may be accessed by the components 210, 212, and 214, via RPC or another interface. The components may communicate with data server 218 via the interface to get and set raw endpoint data based on a unique service name.

Service discovery system 206 may manage endpoint data 238 for plurality of different cloud providers. For example, cloud provider 202 and cloud provider 204 may be separate platforms with different APIs that work differently. Cloud provider 102 may be an AWS cloud provider and cloud provider 204 may be an Azure cloud provider. The manner in which the services are discovered, and the manner in which the endpoints are health checked, may vary from service to service and from one cloud provider to another cloud provider. Although not shown, it should be understood that each service may logically include one or more endpoints that can be used to connect to the service. An endpoint from one service may share the same IP address as an endpoint for another service, but the same name, IP address, and port number should not be endpoints for different services. As such, an endpoint's name, IP address, and port number may be unique to each endpoint. An endpoint's name, IP address, and port number may indicate a unique resource that a client may use to connect with a given service, and each service may have multiple endpoints. In some cases, an IP address alone may be an endpoint.

Figure 3:
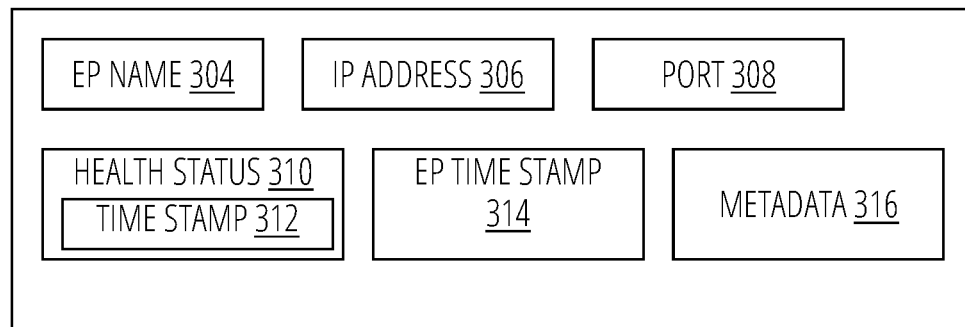
FIG. 3 shows an example of endpoint information, in accordance with some embodiments.

FIG. 3 shows an example of endpoint information, in accordance with some embodiments. Endpoint 302 may be discovered, stored, updated, and retrieved, as described with reference to FIG. 2. For example, in FIG. 2, endpoint data 238 may include a collection of many different endpoints 302, each associated with various services. Endpoint 302 may include one or more data structures that hold information pertaining to a discovered endpoint, as described. In some embodiments, some of the components shown in endpoint 302 are present while others may not be. Some of the components are optional. Endpoint 302 represents a data structure that holds information of an endpoint, which may correspond to a network service, a virtual machine instance, or other endpoint. The components of endpoint 302 may be expressed as a string, a number, a symbol, or other digital representation.

A service discovery system (e.g., 108 or 206) may create, populate, or update an endpoint through discovery, and each endpoint 302 is stored with an association to a given service. Each endpoint may have an endpoint name 304, an internet protocol address 306, and a port number 308. As discussed, the name 304, ip address 306, and port number 308 may be unique to a given endpoint. Once obtained, a client may use this endpoint information to access or connect with a given service that is associated with the endpoint. In some cases, the port number may be empty or omitted, for example, if the endpoint is a host.

In some examples, endpoint 302 includes a health status 310. The service discovery system may perform health checks for endpoints and persist the results of the health check in health status 310. For example, the service discovery system may perform a TCP socket check which may include checking the port status (e.g., open or closed) or polling for responsiveness. The service discovery system may verify whether the endpoint satisfies the criteria specified in the service configuration and if satisfied, the service discovery system may set the health status 310 as 'healthy'. If not satisfied, the service discovery system may set the health status as 'unhealthy'. If the health status has not been performed, then health status 310 may default to 'unknown'.

Further, endpoint 302 may include a health status timestamp 312. The service discovery system may populate this timestamp 312 with the time that the health status 310 is set or the time that the health check was performed. In this manner, when the service discovery system retrieves the endpoint for a client, the service discovery system may consider whether or not the health status of the endpoint is reliable (e.g., if the health information is stale) before relying on the health indicator to present the resulting endpoint information to the client.

Endpoint 302 may include an endpoint timestamp 314. This timestamp may indicate when the endpoint discovery information (e.g., name, ip address, or port) was last populated. When the service discovery system retrieves the endpoint for a client, the service discovery system may consider whether or not the endpoint data such as the name, ip address, or port, are reliable (e.g., if it is new or too old), before presenting the results to the client. Endpoint 302 may also include metadata 316 which may include other information that the service discovery system may tag the endpoint with. Health status timestamp 312 and endpoint timestamp 314 may be deemed by the service discovery system to be stale when either is older than a threshold amount.

Endpoint 302 may serve as a common payload that is passed throughout the service discovery system when discovering endpoints, health checking endpoints, and performing service name resolution.

Figure 4:
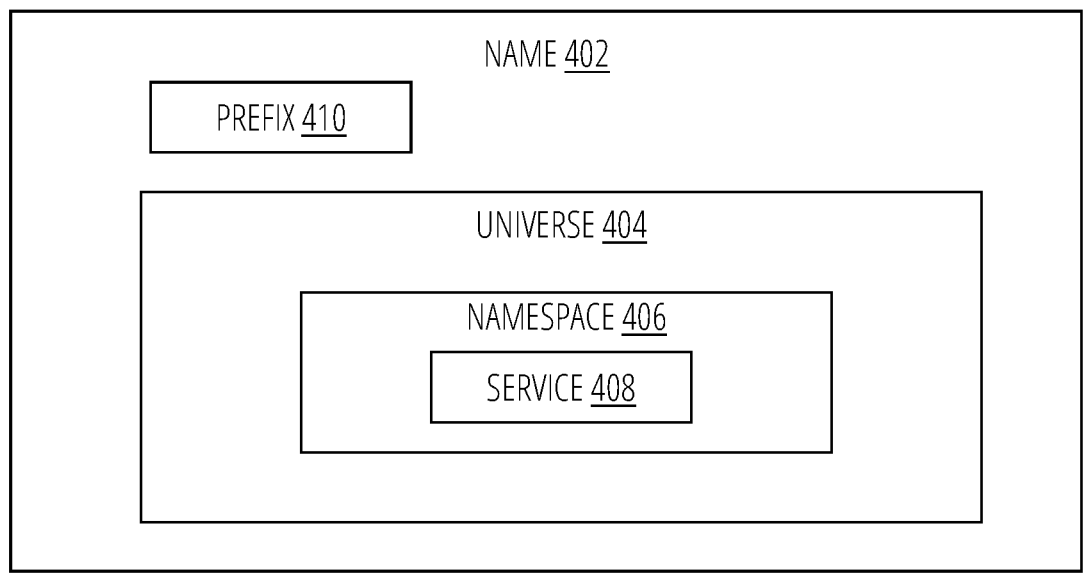
FIG. 4 shows a block diagram representation of an example name for identifying and managing services, according to some embodiments.

FIG. 4 shows a block diagram representation of an example name for identifying and managing services, according to some embodiments. Name 402 can uniquely identify a given service and be used to manage service discovery, name resolution, and health checking, as described in other sections.

Name 402 may be referred to as a service name or a zname. Each name 402 may have an agreed upon well-known prefix 410 which may be common to all names. Beyond the prefix, the name 402 may have a universe 404, a namespace 406, and a service name 408. These components combine to provide a unique identifier for a given service, and also provide divisions that may be leveraged by the service discovery system to manage respective endpoints along those divisions.

Although the name 402 is represented symbolically with blocks in this figure, the entire name 402 may be a path-shaped string. For example, a name 402 may uniquely identify a symbol as a string "/zns/prod1/fdb/replica-canary", or "/zns/va/gs/topology-master".

The prefix "/zns/" indicates to parties (e.g., a service discovery system, a client, or other parties) that this string follows the name convention described herein. A unique combination of symbols may serve as the prefix, and it may vary without departing from the scope of the present disclosure. In some examples, path components of the name may include restrictions similar to DNS labels, such as only lower case letters, numbers, and dashes ('-') can be used, or the length of each path component is limited to 63 characters. Such restrictions may allow the service discovery name 402 to have a well-defined mapping to DNS.

A universe 404 may represent a top-level component in a zname, and correspond to a set of namespaces that share a common storage or failure domain. In some examples, each deployment of an application may correspond to a single universe (e.g. 'prod1' or 'va' in the above examples). As such, all services that share the same universe 404 may share a common storage or failure domain.

A namespace 406 may represent a logical grouping of a set of related services, such as those that share a common administrative authority (e.g., a common team or organization). In addition to reducing the collision possibilities for common service names (e.g. 'replica'), the namespace provides a natural boundary for managing configuration.

For example, a service configuration that is stored in source control may separate each namespace into a separate file or directory, and use code ownership policies to control updates to a set of service definitions which may be maintained by a single team. The service name 408 may represent a unique service within a given namespace 406.

In such a manner, the name 402 is structured such that development and deployment may be performed along the lines drawn by the different components of the name while also supporting management of the endpoints by a service discovery system along those same lines. The service discovery system may follow instructions of a service configuration, which may be organized according to universe, namespace, and service name.

Figure 5:
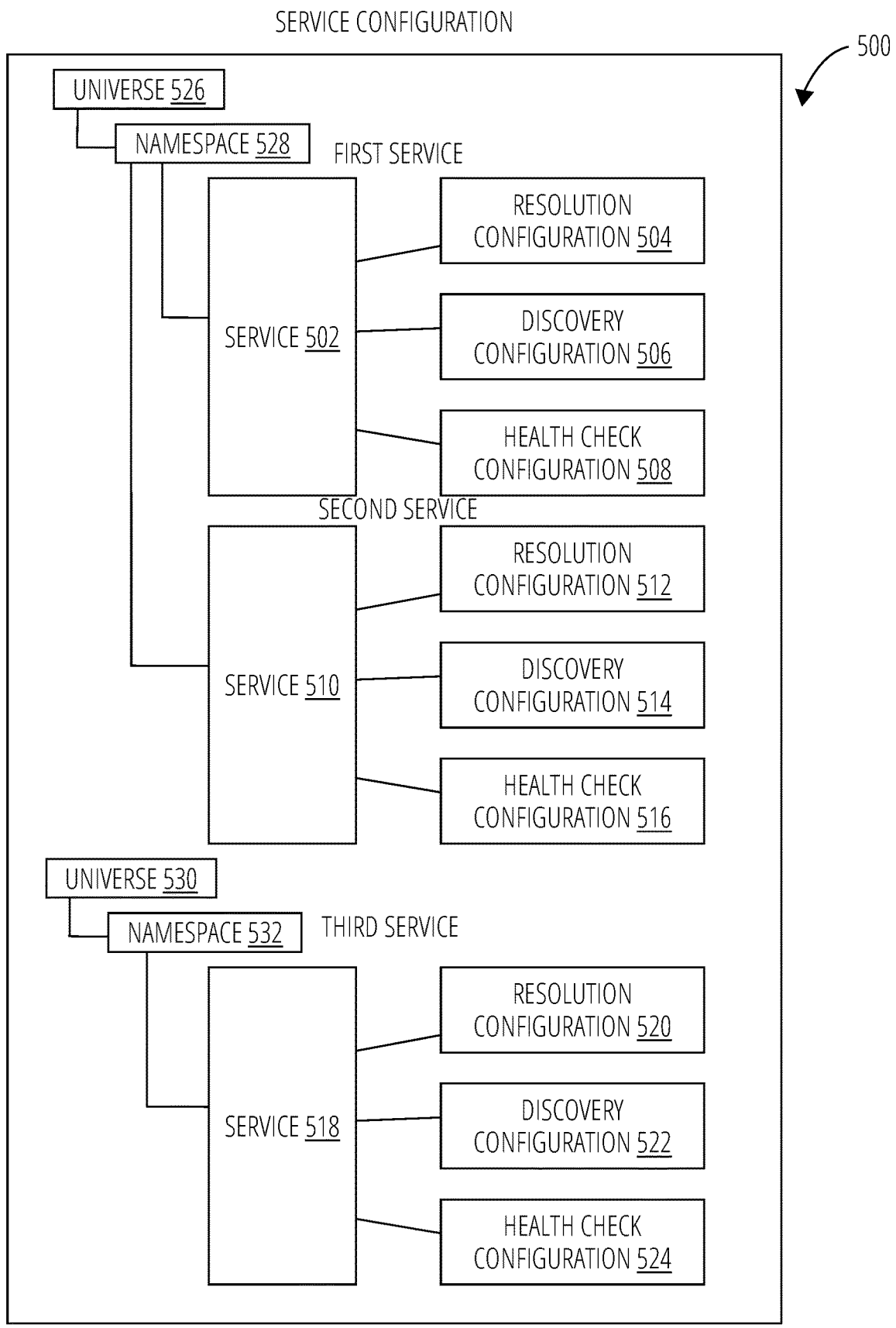
FIG. 5 shows an example of a service configuration, according to some embodiments.

FIG. 5 shows an example of a service configuration 500, according to some embodiments. Service configuration 500 may be a file, a database, an application, or a combination thereof. It may be singular or distributed. Further, it may be integral to the service discovery system described in other sections, or reside independently on a host. In some aspects, it may reside in a repository for software project management (e.g., GitHub, Subversion, or equivalent technology).

A service configuration 500 may include unique names and configuration information that is unique to each name. As described, each unique name may include a universe, namespace, and service component. Each name may be associated with respective configuration information (resolution configuration, discovery configuration, and health check configuration). Further, each service may be organized in the service configuration along the lines of its universe, namespace, and service component. A universe may include many namespaces, which may each include many service components. Each combination of universe, namespace, and service represents a unique service that may have its own set of configuration information.

For example, a first service that is defined by the universe 526, namespace 528, and service component 502, is associated with resolution configuration 504, a discovery configuration 506, and a health check configuration 508. A second service in the same universe and namespace as the first service, is defined by the universe 526, namespace 528, and service component 510. The second service is associated with resolution configuration 512, a discovery configuration 514, and a health check configuration 516.

A third service in a different universe and namespace, is defined by universe 530, namespace 532, and service 518. The third service is associated with resolution configuration 520, a discovery configuration 522, and a health check configuration 524. Associations may be formed through nesting of the data in service configuration 500, which may have a known format such as, for example, YAML, JSON, or other format which may be in human-readable form.

The resolution configuration 504 includes filtering instructions that are specific to the first service. A service discovery system may lookup these filtering instructions with the service name (e.g., universe, namespace, and service), and apply these filtering instructions to endpoints that are resolved with the first service, as described. As such, resolution configuration specifies how the discovered endpoints (which may also be referred to as hosts) are presented to a client after discovery. The instructions may specify to override discovered values, filter stale or unhealthy endpoints, or perform other post-discovery transformations. If the resolution configuration for a given service is empty, the discovered endpoints for that service may be presented to a client 'raw', e.g., without filtering. As described, the filtering instructions may also include instructions to transform the raw data (e.g., by overwriting, removing, or adding some discover information to the raw data.

Similarly, discovery configuration 506 includes discovery instructions that are specific to the first service. The service discovery system may lookup these discovery instructions at universe 526, namespace 528, and service 502, and perform the discovery instructions to obtain endpoint information for the first service. Service discovery system may store the discovered endpoint information, as described.

Similarly, health check configuration 508 includes health check instructions that are specific to the first service. The service discovery system may lookup these health check instructions at universe 526, namespace 528, and service 502, and perform the health check on each of the discovered endpoints for the first service. The health check configuration specifies how the endpoints of the service should be evaluated for liveness. In some cases, if health check configuration is empty, the service discovery system may skip health checks for the endpoints. Service discovery system may store the health check results (e.g., healthy or unhealthy) with the discovered endpoint information (e.g., an endpoint name, ip address, port number, or a combination thereof) in memory (e.g., a database). In some cases, the health check results may default to healthy, for example, depending on the discovery type.

As discussed, a user (e.g., a service owner), may configure the resolution configuration, the discovery configuration, and health check configuration for a given service, which may vary from one service to another.

Figure 6:
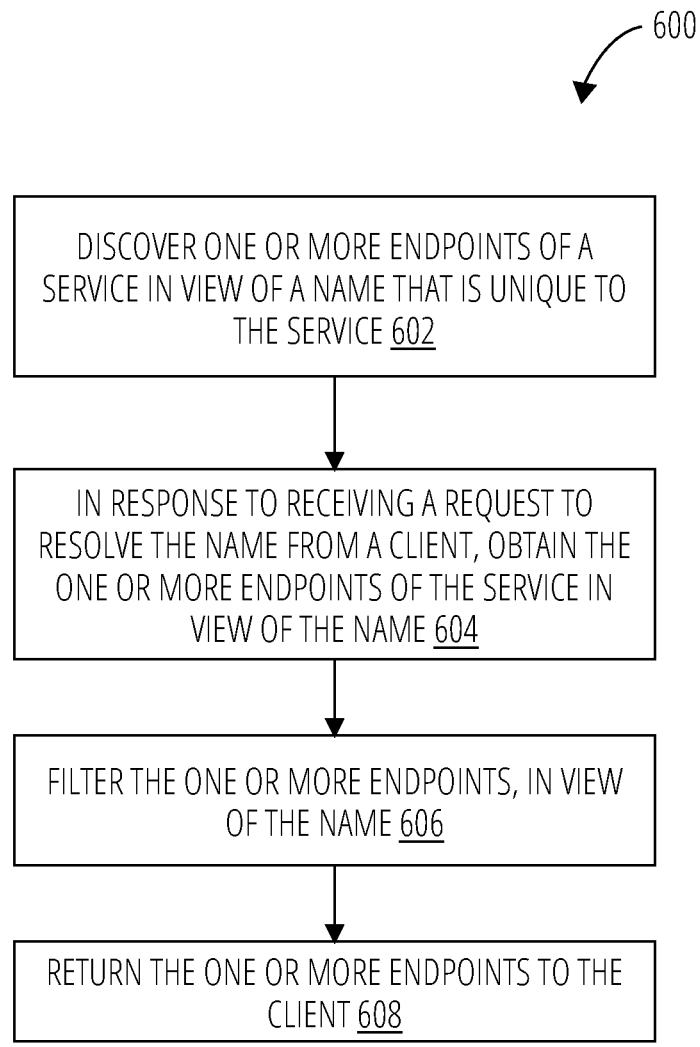
FIG. 6 is a flow diagram of a method for managing service discovery, in accordance with some embodiments.

FIG. 6 is a flow diagram of a method for managing service discovery, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by a service discovery system as described in other sections.

Method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

At block 602, processing logic may discover one or more endpoints of a service in view of a name that is unique to the service. At block 604, in response to receiving a request to resolve the name from a client, processing logic may obtain the one or more endpoints of the service in view of the name. At block 606, processing logic may filter the one or more endpoints, in view of the name. At block 608, processing logic may return the one or more endpoints which are filtered, to the client. The name may be a zname, as described with respect to FIG. 4.

In some examples, method 600 further comprises performing a health check on the one or more endpoints of the service, in view of the name. This may include obtaining health check instructions that are specific to the name, to test the health of the one or more endpoints of the service. The health check instructions may include performing a socket check or querying an HTTP endpoint. In some examples, the health check and the discovery are each performed asynchronously in view of respective schedules.

In some examples, discovering the one or more endpoints of the service in view of the name includes obtaining discovery instructions that are specific to the name, to obtain an IP address and port number of each of the one or more endpoints of the service. The discovery instructions may include at least one of: static enumeration of IP addresses, periodic resolution of a Domain Name System of each of the one or more endpoints, querying a tag in a cloud provider of the service, or registration of the service through remote procedure call (RPC).

In some examples, filtering the one or more endpoints in view of the name includes obtaining filtering instructions that are specific to the name, and applying those filtering instructions to the one or more endpoints. The filtering instructions may include at least one of: removing any of the one or more endpoints that are stale, removing any of the one or more endpoints that are unhealthy, or selecting a subset of the one or more endpoints in view of the client or information in the request.

Figure 7:
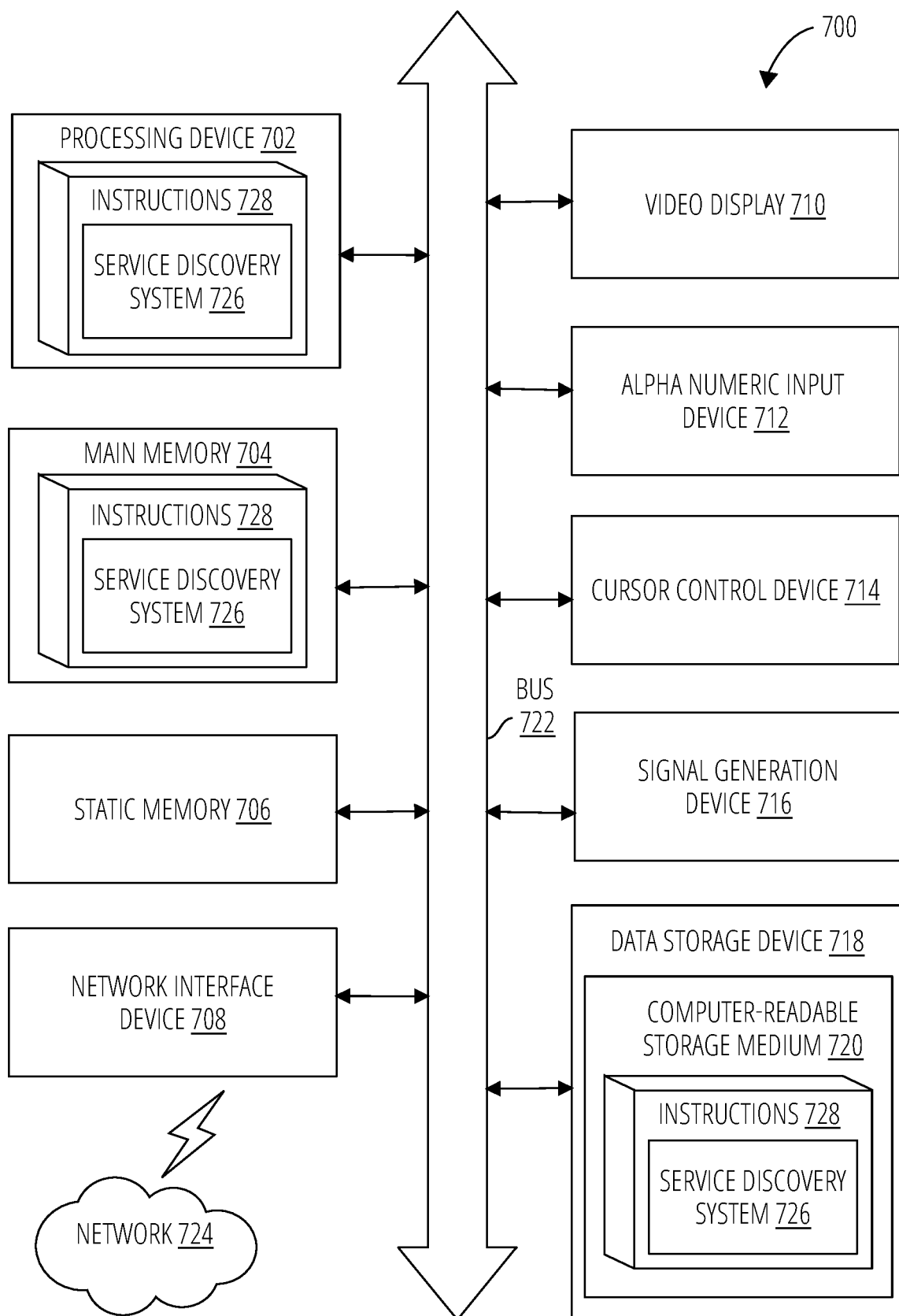
FIG. 7 is a block diagram of an example computing device 700 that may perform one or more of the operations described herein, in accordance with some embodiments.

FIG. 7 is a block diagram of an example computing device 700 that may perform one or more of the operations described herein, in accordance with some embodiments.

For example, the computing device may manage service discovery, health checking and name resolution, as described herein.

Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device 702 (e.g., a general purpose processor, a PLD, etc.), a main memory 704 (e.g., synchronous dynamic random access memory (DRAM), read-only memory (ROM)), a static memory 706 (e.g., flash memory and a data storage device 718), which may communicate with each other via a bus 722.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 724. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 720 on which may be stored one or more sets of instructions 728 that may include instructions for a processing device, for carrying out the operations described herein, in accordance with one or more aspects of the present disclosure. Instructions 728 may also reside, completely or at least partially, within main memory 704 and/or within processing device 702 during execution thereof by computing device 700, main memory 704 and processing device 702 also constituting computer-readable media. The instructions 728 may further be transmitted or received over a network 724 via network interface device 708. The instructions 728 may contain instructions of a service discover system 726 that, when executed, perform the operations and steps discussed herein. Service discovery system 726 may perform the operations and methods as described in other sections, such as those performed with respect to service discovery system 108, service discovery system 206, and method 600.

While computer-readable storage medium 720 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Unless specifically stated otherwise, terms such as "obtaining", "receiving,", "referencing", "lookup," "updating," "providing,", "scheduling", "monitoring", "storing", "setting", "getting", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   obtaining a discovery instruction that is specific to a name that is unique to a service including performing a lookup with the name to obtain the discovery instruction that corresponds to the name, the discovery instruction comprising at least an instruction to query a cloud provider of the service to discover the one or more endpoints;
   performing, by a processing device, the discovery instruction including querying the cloud provider of the service to discover an internet protocol (IP) address and port number of one or more endpoints of the service; and
   in response to receiving a request to resolve the name from a client, returning the one or more endpoints including the IP address and the port number to the client.

2. The method of claim 1, wherein the discovery instruction comprises a static enumeration of one or more IP addresses to discover the one or more endpoints of the service.

3. The method of claim 1, wherein the discovery instruction comprises a periodic resolution of a Domain Name System of each of the one or more endpoints.

4. The method of claim 1, wherein querying the cloud provider includes querying the cloud provider with a tag key of the discovery instruction.

5. The method of claim 1, wherein the discovery instruction comprises an instruction to register the service through a remote procedure call (RPC).

6. The method of claim 1, wherein obtaining the discovery instruction includes referencing a configuration file to obtain the discovery instruction that corresponds to the name, wherein the configuration file comprises a plurality of names and a respective discovery instruction for each of the plurality of names.

7. The method of claim 1, further comprising obtaining a health check instruction that is specific to the name, and performing the health check instruction to test and store a health status of the one or more endpoints of the service, wherein performing the health check instruction and the discovery instruction is done asynchronously in view of respective schedules.

8. A system comprising:
a memory; and
a processing device, operatively coupled to the memory, the processing device to:
obtain a discovery instruction that is specific to a name that is unique to a service including performing a lookup with the name to obtain the discovery instruction that corresponds to the name, the discovery instruction comprising at least an instruction to query a cloud provider of the service to discover the one or more endpoints;
perform, by the processing device, the discovery instruction, including querying the cloud provider of the service, to discover an internet protocol (IP) address and port number of one or more endpoints of the service; and
in response to receiving a request to resolve the name from a client, return the one or more endpoints including the IP address and the port number to the client.

9. The system of claim 8, wherein the discovery instruction comprises a static enumeration of one or more IP addresses to discover the one or more endpoints of the service.

10. The system of claim 8, wherein the discovery instruction comprises a periodic resolution of a Domain Name System of each of the one or mom endpoints.

11. The system of claim 8, wherein querying the cloud provider includes querying the cloud provider with a tag key of the discovery instruction.

12. The system of claim 8, wherein the discovery instruction comprises an instruction to register the service through a remote procedure call (RPC).

13. The system of claim 8, wherein to obtain the discovery instruction includes to reference a configuration file to obtain the discovery instruction that corresponds to the name, wherein the configuration file comprises a plurality of names and a respective discovery instruction for each of the plurality of names.

14. The system of claim 8, wherein the processing device is further to obtain a health check instruction that is specific to the name, and perform the health check instruction to test and store a health status of the one or more endpoints of the service, wherein performing the health check instruction and the discovery instruction is done asynchronously in view of respective schedules.

15. A non-transitory computer-readable storage medium, the computer-readable storage medium including instructions that when executed by a processing device, cause the processing device to:
obtain a discovery instruction that is specific to a name that is unique to a service including performing a lookup with the name to obtain the discovery instruction that corresponds to the name, the discovery instruction comprising at least an instruction to query a cloud provider of the service to discover the one or more endpoints;
perform, by the processing device, the discovery instruction including querying the cloud provider of the service to discover an internet protocol (IP) address and port number of one or more endpoints of the service; and
in response to receiving a request to resolve the name from a client, return the one or more endpoints including the IP address and the port number to the client.

16. The non-transitory computer-readable storage medium of claim 15, wherein the discovery instruction comprises a static enumeration of one or more IP addresses to discover the one or more endpoints of the service.

17. The non-transitory computer-readable storage medium of claim 15, wherein the discovery instruction comprises a periodic resolution of a Domain Name System of each of the one or more endpoints.

18. The non-transitory computer-readable storage medium of claim 15, wherein querying the cloud provider includes querying the cloud provider with a tag key of the discovery instruction.

19. The non-transitory computer-readable storage medium of claim 15, wherein the discovery instruction comprises an instruction to register the service through a remote procedure call (RPC).

20. The non-transitory computer-readable storage medium of claim 15, wherein to obtain the discovery instruction includes to reference a configuration file to obtain the discovery instruction that corresponds to the name, wherein the configuration file comprises a plurality of names and a respective discovery instruction for each of the plurality of names.

* * * * *